Apr. 10, 1923.
L. C. CRUYT
WET FILTER SCREEN
Filed July 22, 1919
1,450,951
Fig.1.
Fig.2.
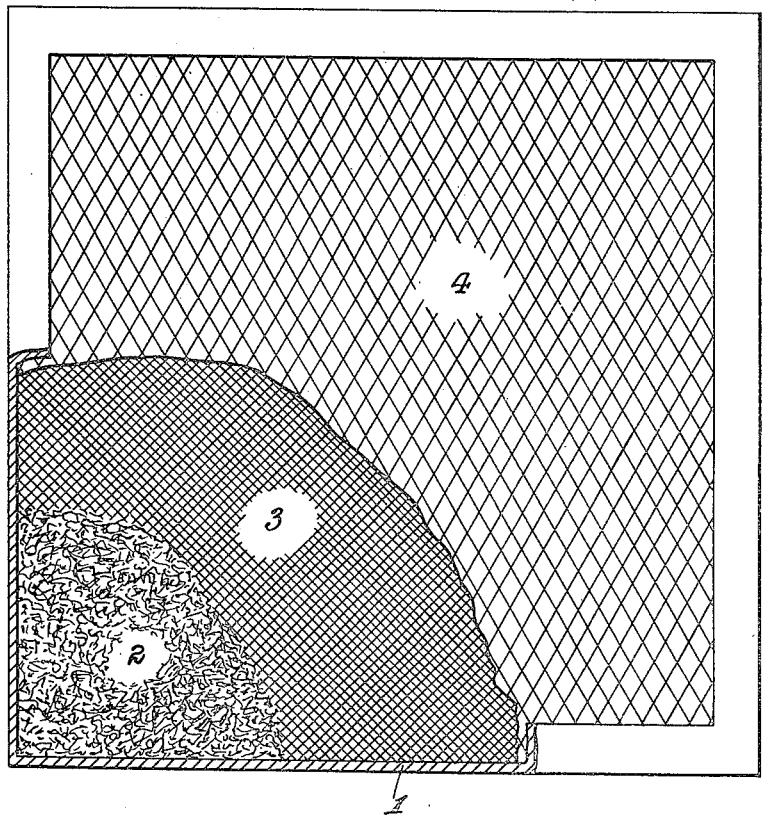
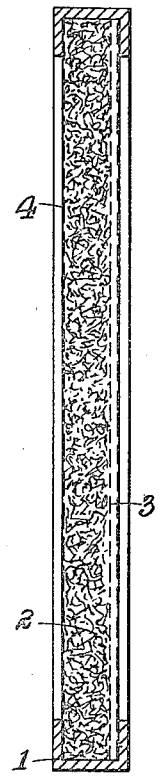
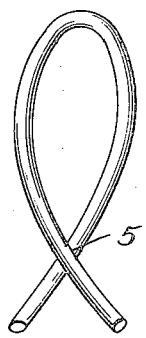
Fig.3.
Lucien Charles Cruyt
Inventor
by Seward Davis
his Attorney Patented Apr. 10, 1923.

1,450,951

UNITED STATES PATENT OFFICE.

LUCIEN CHARLES CRUYT, OF LONDON, ENGLAND, ASSIGNOR TO HEENAN & FROUDE LIMITED, OF WORCESTER, ENGLAND.

WET-FILTER SCREEN.

Application filed July 22, 1919. Serial No. 312,624.

*To all whom it may concern:*

Be it known that I, LUCIEN CHARLES CRUYT, subject of the King of Belgium, residing at 315 Oxford Street, London, W. 1, engineer, have invented new and useful Improvements in Wet-Filter Screens, of which the following is a specification.

This invention relates to improvements in wet-filter screens used for bringing gases and liquids into intimate contact for the purpose of filtering, cleansing, cooling, heating or otherwise treating either or both of the substances.

In the art to which this invention relates it has been the practice to employ a porous material such as coke or to build up a spongiform screen of some porous material which is then wetted or infiltrated with the liquid and through which gas is then passed.

In theory, the interstices in such a screen, present a large surface for the liquid to spread over and also split up the flow of gas into a multiplicity of small streams, which, passing through the interstices, come into intimate contact with the liquid.

In practice, however, the screens are notably inefficient that is to say the whole of the surface presented is not wetted. A wet-surface efficiency of about 70 per cent has been considered good but generally the wet-surface efficiency falls away rapidly to values as low as 40 per cent. Consequently, screens have had to be designed to pass a much larger volume of gas than required.

This falling off in efficiency is due to several causes amongst which may be stated the fact that the liquid generally used is water and since water possesses a greater surface tension than most liquids it coheres about and blocks the interstices in the coke or other material of the screen preventing the passage of gas.

Again the dirt or dust-laden gas in its passage through the screen parts with its solid particles which adhere to the screen and choke the interstices effectively preventing the passage of liquid or gas. Clogging or choking of the screen also takes place when the material forming the screen is rough and not smooth because beads of water or other liquid and dirt cling to the rough surface.

The object of this invention is to improve the wet-surface efficiency of the screen and thereby reduce the dimensions and cost of same.

To this end therefore I employ smooth non-porous material with which to form the body of the screen. Such material presents a smooth even surface for the liquid to flow over and this continuous flow of liquid carries away with it all the solid matter abstracted from the gas. Moreover, as there are no rough surfaces surrounding the interstices they do not become choked or clogged.

Some suitable materials for this purpose are metal wire, round or ovalized, metal ribbons and glass or celluloid filaments or ribbons. Other materials having the characteristics set forth may also be used.

The drawing illustrates a screen constructed according to this invention, in which, Figure 1 is an elevation partly broken away, and Figure 2 is a vertical section of same.

Figure 3 is a diagrammatic representation of an open sided loop formed by the intersection of one of the filamentous elements constituting the matted mass of my improved screen.

In the drawing 1 designates a frame of wood or metal of channel section filled with smooth non-porous material such as metallic wood 2 tangled into a spongiform mass, said mass being inherently characterised by the presence of a large proportion of interstices formed by the intersection of the filamentous elements of the mass, which interstices are open-sided at one point, as shown diagrammatically, at 5 in Figure 3, in which the sides of the loop therein shown pass one behind the other at the points of intersection leaving an open space through which the liquid adhering to the surface of the wire drains, defeating the tendency of said liquid to form a film over the interstice as would be the case were the latter a completely closed loop.

The mass is retained in place by a sheet of wire 3 and an outer sheet of expanded metal 4 on each side of the frame.

When metal wire or ribbon is used it may be galvanized or otherwise treated to prevent corrosion due to the liquid or gas. Similarly when other materials are used they may be provided with a protective coating. Aluminium wire or ribbon is very suitable material in some cases.

Screens as above described are arranged in a suitable duct and sprayed or otherwise infiltrated with liquid.

I claim:

A wet-filter for gas comprising a screen and a filling medium associated therewith and composed of a mass of smooth, non-porous, filamentous elements adapted to be wet by liquid flow thereover and matted together to form interstices for the passage of gas therethrough.

Signed at London this 3rd day of July, 1919.

LUCIEN CHARLES CRUYT.